UNITED STATES PATENT OFFICE.

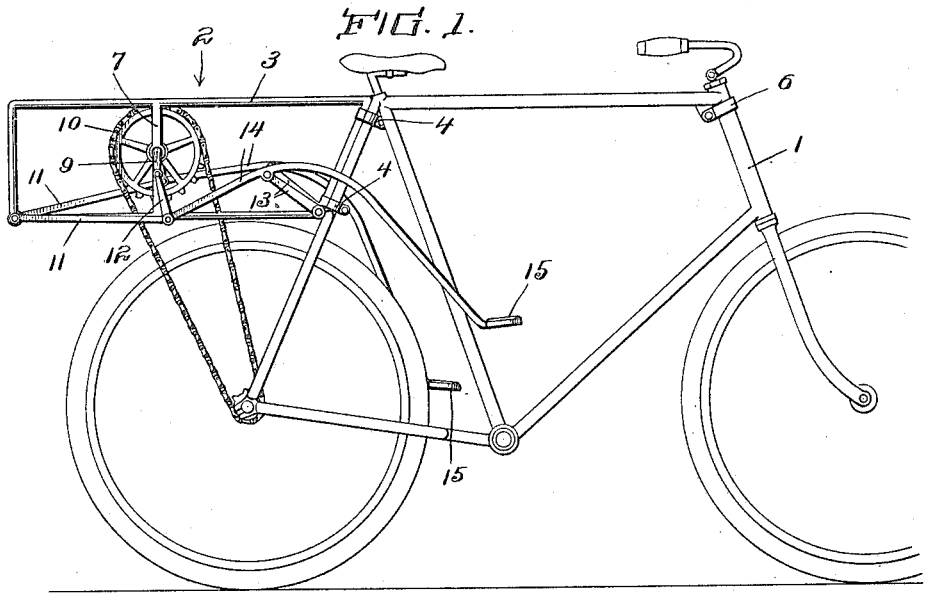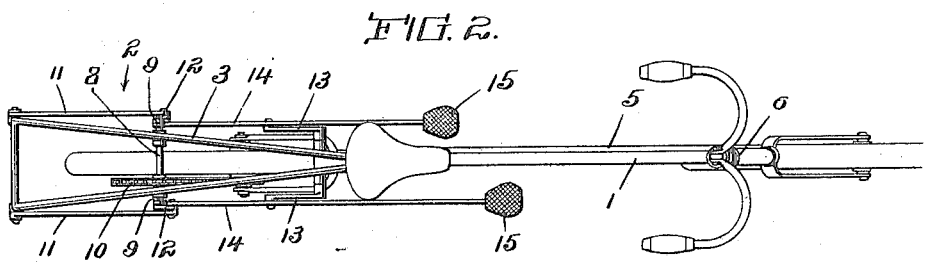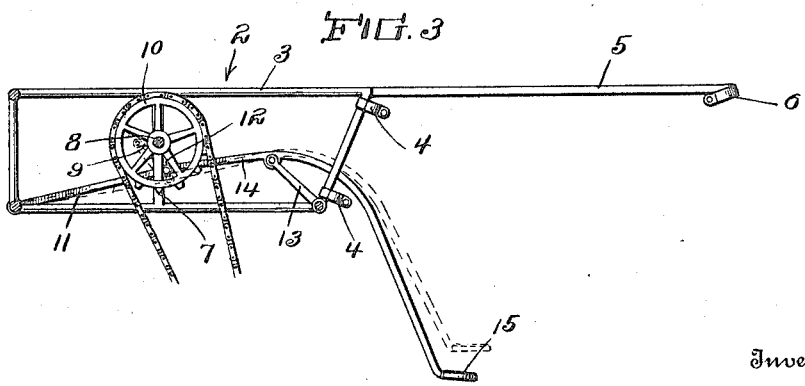

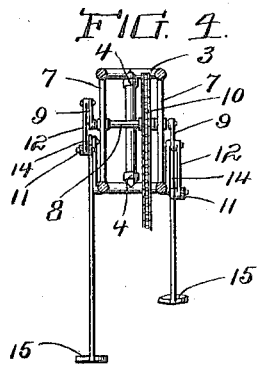
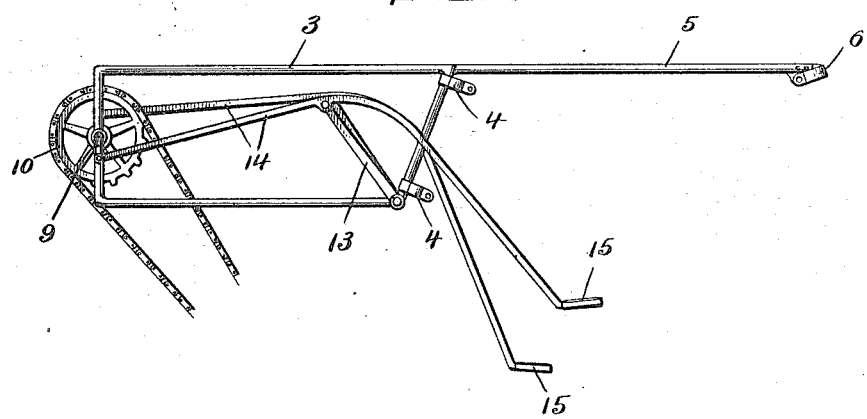
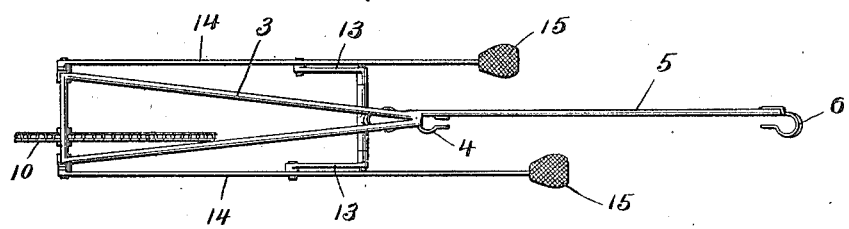

HENRY A. BIOT, OF MEDICAL LAKE, WASHINGTON.

PROPELLING ATTACHMENT FOR BICYCLES.

1,202,656.

Specification of Letters Patent.

Patented Oct. 24, 1916.

Application filed January 4, 1916. Serial No. 70,285.

*To all whom it may concern:*

Be it known that I, HENRY A. BIOT, a citizen of the United States, residing at Medical Lake, in the county of Spokane and State of Washington, have invented new and useful Improvements in Propelling Attachments for Bicycles, of which the following is a specification.

This invention relates to improvements in attachments for bicycles and similar vehicles and has particular application to a propelling attachment for such vehicles.

In carrying out the present invention, it is my purpose to provide a propelling attachment for bicycles, velocipedes, etc., which may be quickly and conveniently applied to the vehicle and whereby the vehicle may be propelled with a minimum effort on the part of the operator.

It is also my purpose to provide a device of the class described which will operate efficiently and effectively under all conditions, which will embrace the desired features of simplicity, efficiency and durability and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

In the accompanying drawings, Figure 1 is a view in side elevation of a bicycle equipped with propelling apparatus constructed in accordance with my present invention. Fig. 2 is a top plan view of the same. Fig. 3 is a longitudinal sectional view through the attachment removed from the bicycle. Fig. 4 is a transverse sectional view through the same. Fig. 5 is a view in side elevation showing a modified form of the apparatus. Fig. 6 is a top plan view thereof.

Referring now to the drawings in detail, 1 designates a bicycle of any suitable construction, while 2 indicates my improved propelling attachment as an entirety.

My improved attachment comprises a frame 3 substantially triangular shape in horizontal section provided at its apex with clamps 4, 4 suitably spaced apart and adapted to embrace the rear post of the bicycle below the seat, and with a forwardly projecting bar 5 terminating adjacent to the front post of the vehicle and having the forward end thereof equipped with a clamp 6 designed to encircle the front post of the vehicle, the clamps 4 and 6 coöperating with each other to hold the frame 3 upon the bicycle. In the present instance, the frame 3 embodies essentially an upper triangular portion and a lower triangular portion connected and spaced apart by vertical members at their rear extremities, the whole being substantially wedge shaped. This frame 3 projects beyond the rear end of the vehicle and suitably secured to the top and bottom bars of the side members of the frame are vertical supports 7. Journaled in the supports 7 is a horizontal shaft 8 and secured to the opposite ends of the shaft 8 are diametrically opposed cranks 9, while keyed upon the shaft is a sprocket wheel 10. 11, 11 indicate links each having one end pivoted to the frame 3 at the rear extremity of such frame, and the remaining ends of these links are disposed below the respective crank arms 9, while interconnecting the crank arms and the links are connecting rods 12. Pivoted to the frame 3 adjacent to the forward end thereof are links 13 and fulcrumed upon the outer ends of the links 13 are levers 14. One end of each lever 14 terminates at the center of the frame of the bicycle in the form of a pedal 15, while the remaining extremities of the levers are pivoted to the connecting rod ends of the links 11 respectively.

In accordance with my present invention, the chain of the bicycle is removed from the pedal operated sprocket and trained over the sprocket wheel 10 so that the sprocket wheel 10 will be connected to the driving sprocket pinion of the bicycle.

In practice, my improved propelling attachment is secured to the frame of the bicycle by the clamps 4 and 6 and in this position of the attachment the pedals 15 are under the control of the feet of the operator. The chain of the bicycle is now removed from the pedal driven sprocket and trained over the sprocket wheel 10 so that in the operation of the levers 14 under the action of the pedal extremities of the operator the bicycle will be propelled.

In the modified construction illustrated in Figs. 5 and 6 of the drawings, I have shown the horizontal shaft 8 as carried by the vertical bars at the rear end of the frame 3, and the levers 14 as relatively long and having the rear ends thereof connected directly to the cranks 9 on the ends of the shaft, the links 11 and connecting rods 12 being eliminated.

It will be seen that I have provided a propelling attachment for bicycles, velocipedes and similar vehicles whereby the vehicle may be propelled with a minimum effort on the part of the operator, and which may be readily applied to the vehicle and removed therefrom.

I claim:

1. In a propelling attachment for bicycles, etc., a frame, clamps on said frame adapted to embrace the rear post of the bicycle frame, an arm secured to the one end of said frame and projecting toward the front post of the bicycle frame, a clamp on the forward end of said arm encircling the adjacent post of the frame of the bicycle, and foot operated mechanism carried by said frame and connected to the driving wheel of the bicycle.

2. In a propelling attachment for bicycles, etc., a frame, clamps on said frame adapted to embrace the rear post of the bicycle frame, an arm secured to the one end of said frame and projecting toward the front post of the bicycle frame, a clamp on the forward end of said arm encircling the adjacent post of the frame of the bicycle, a sprocket wheel on said frame, a chain connecting said sprocket wheel to the driving pinion of the bicycle, levers pivoted upon said frame, each having one end disposed within the reach of one of the feet of the operator, and connections between the remaining ends of said levers and said sprocket wheel whereby the latter may be rotated by the operation of said levers.

In testimony whereof I affix my signature in presence of two witnesses.

HENRY A. BIOT.

Witnesses:
HENRY MACHMULLER,
WILLIAM F. HINER.

Copies of this patent may be obtained for five cents each, by addressing the "Commissioner of Patents, Washington, D. C."